Patented Mar. 4, 1947

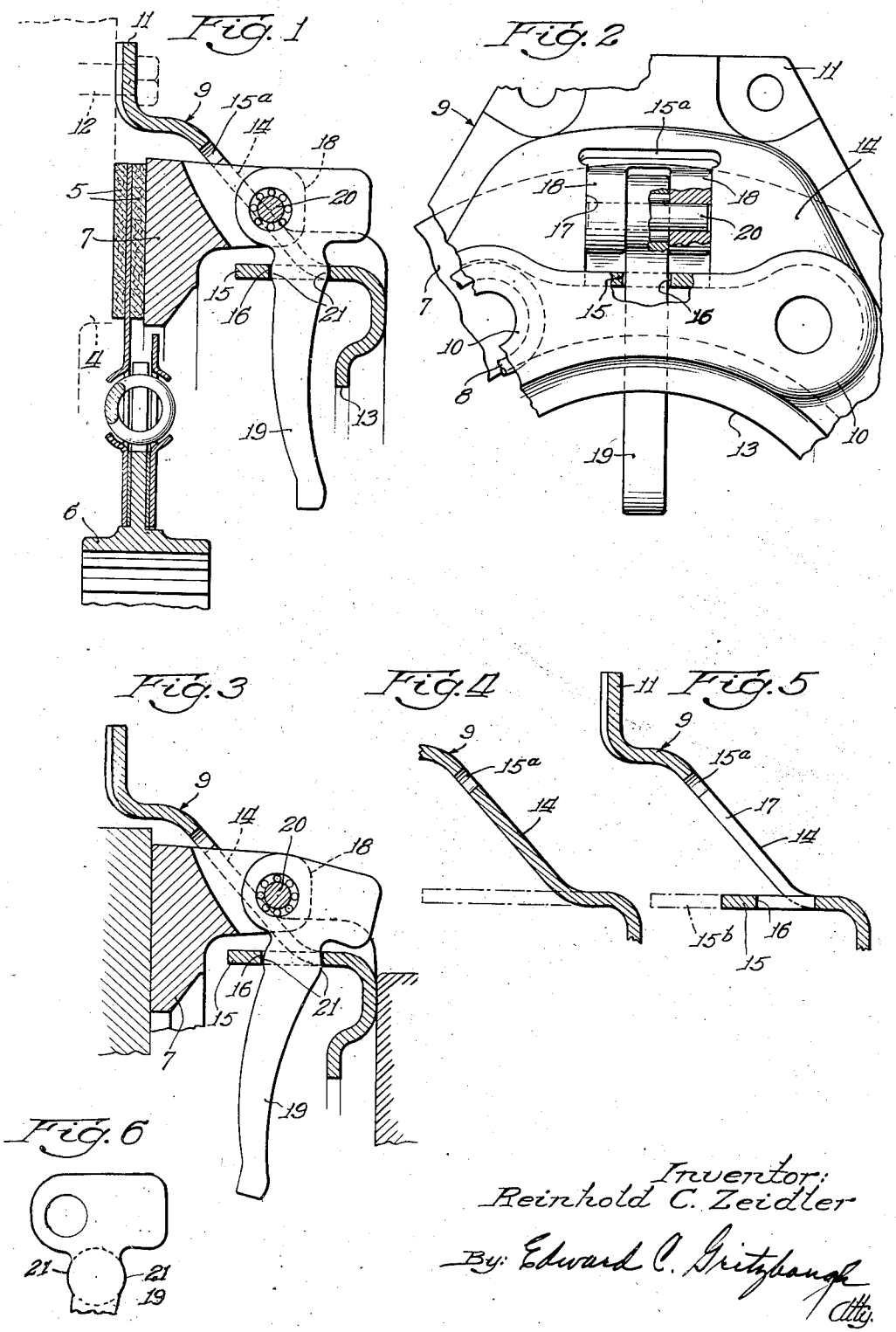

2,417,035

UNITED STATES PATENT OFFICE 2,417,035

CLUTCH COVER AND OPERATING LEVER ASSEMBLY

Reinhold C. Zeidler, Detroit, Mich., assignor to Borg-Warner Corporation, Chicago, Ill., a corporation of Illinois Application October 14, 1943, Serial No. 506,139

7 Claims. (Cl. 192—68)

This invention relates generally to clutches such as used in motor-driven vehicles, boats, and other conveyances. It will be appreciated, however, that the principles herein contemplated are readily applicable for other uses where drive and driven shafts are adapted to be intermittently connected and disconnected. More particularly the present improvements relate to the clutch cover and to the manner of assembling the clutch operating lever with such cover.

It is one of the principal objects of this invention to simplify the construction of a clutch cover and an operating lever assembly such as contemplated herein, and to improve the efficiency and operation of such devices.

Also it is an object of this invention to provide a structure such as disclosed herein that is of a simplified construction and comprises fewer parts than at present required in assemblies of this character, thus effecting a substantial reduction in the cost of both material and labor.

Another object resides in providing simple and efficient means for fulcruming a clutch operating lever, the said means comprising an integral part of the cover and preferably a stamped-out portion of said cover. This eliminates numerous separate parts that heretofore have been employed to fulcrum the lever, and it also reduces the time and labor requisite in fabricating and assembling these excessive parts with the cover and the operating levers of a clutch.

A further object of this invention is to provide novel means for the retention of the lever clevis pin against accidental displacement or dislodgment, and in this connection several superficial parts heretofore used have been eliminated.

Additional objects, aims, and advantages of the present invention will be apparent to those skilled in the art after the construction and operation of the clutch cover and operating lever assembly is understood from the within description.

It is preferred to accomplish the numerous objects of this invention and to practice the same in substantially the manner hereinafter fully described and as more particularly pointed out in the appended claims, reference being made to the accompanying drawings that form a part of this specification.

Fig. 1 is a vertical sectional view, taken on a plane radial to the axis of the clutch, showing a clutch cover and operating lever assembly such as contemplated herein, the elements of the clutch being disposed in their engaged or normally operating relationship.

Fig. 2 is a vertical front elevational view of a fragmentary portion of the cover and the clutch operating lever that is shown in Fig. 1.

Fig. 3 is a sectional view, similar to Fig. 1, illustrating the manner of inserting the lever fulcrum or clevis pin.

Figs. 4 and 5 are fragmental diagrammatic views illustrating certain successive steps in forming the lever fulcrum element in the clutch cover.

Fig. 6 is a side elevation of the operating lever showing the manner of shaping the fulcrum portion thereof.

The drawings are to be understood as being more or less of a schematic character for the purpose of disclosing a typical or preferred form of the improvements contemplated herein, and in these drawings like reference characters identify the same parts in the several views.

In Fig. 1 the clutch assembly, which is of a well-known type, comprises the flywheel 4, the friction members 5, the splined clutch hub 6 on the drive shaft (not shown), and the pressure plate 7 that is urged into engagement with the friction members 5 by a plurality of elastic elements such as spiral springs 8 interposed between said pressure plate and the clutch cover plate, the latter identified as a whole by the numeral 9. The outer ends of the springs 8 preferably are disposed in seats 10 formed in the cover plate 9 and their inner ends surround stubs (not shown) projecting from the outer face of the pressure plate 7 that confronts the cover.

The cover plate 9 is preferably a heavy sheet metal stamping that comprises a body portion of dish-shaped section and an outwardly flared marginal portion that provides an annular attaching flange 11 by which the cover is securely anchored to the flywheel 4 by bolts 12. The central portion of this cover plate has a circular opening 13 that is of sufficient dimension to provide clearance for the shaft bearings and other instrumentalities of the clutch and driving mechanism.

The annular wall 14 of the dish-shaped body portion of the cover is disposed at an angle to both the attaching flange 11 and the portion of the cover that is provided with the opening 13, so that the said portions are in offset relation with respect to each other. The angular disposition of the annular wall 14 with respect to the above-mentioned portions of the cover plate may be determined according to the shape and the relation of adjacent parts of the clutch and shaft assembly. In the present instance this annular wall 14 is shown as oblique, which presents a body portion in the form of a truncated geometric figure, the said wall thus performing the function of a strut member that acts to strengthen the cover and provide a rigid closure.

A plurality of lips 15 are supported by portions of the cover plate for coactive relation with the operating levers of the clutch, the said lips 15 being disposed intermediate the spring seats 10 and preferably formed integral with the cover 9 as shown. The lip may be made in any desired manner such as by piercing an open slot 15a in the cover, then making lateral cuts at the ends of the slot and bending inward the tongue of metal between these cuts, as suggested in Figs. 4 and 5. This provides a rectangular opening 17 in the cover with the lip 15 projecting inward from the lower margin of such opening. During these operations a rectangular opening 16 is made in the body of the lip and a portion 15b of the free or unattached end of the lip may be severed from the tongue of metal.

The width of rectangular slot 17 is such that the side edges fit closely but freely against the sides of the pressure plate lugs 18 projecting through it thus constituting a driving connection between the stamped over and the pressure plate.

The pressure plate of the clutch has a clevis embodying spaced lugs 18 that project through the opening 17 of the cover and between these lugs the pivoted end of the operating lever 19 is movably mounted on a pin 20. The elongate arm of lever 19 passes through the rectangular opening 16 in the lip 15 and it is provided with a fulcrum boss 21 where it engages the edges of the opening 16. The opposite faces of this boss 21 are of arcuate shape the curvature being arcs of a circle as suggested in dotted lines in Fig. 6. By means of this arrangement the swinging movement of the lever will fulcrum it in the lip opening 16 while pivoting on the pin 20 to operate the pressure plate 7.

The pivot pin 20 for the operating lever 19 is retained in position in the clevis lugs 18 by reason of the fact that the side edges of the opening 17 in the cover are positioned across the ends of said pin and the pin apertures in the clevis, substantially in the manner shown in Figs. 1 and 2. The ends of the pins are rounded to prevent pins catching or scraping the edges of the slots.

The insertion of the pin 20 is accomplished preferably by using a fixture such as an arbor press and compressing the pressure plate 7 beyond its full release position which compresses the springs 8 beyond their normal compression and uncovers the pin openings in the head of the operating lever 19 as shown in Fig. 3. While the parts are held in this abnormal position the pin is inserted into its proper place, after which the pressure plate and springs are released to permit them to assume their normal operating positions where the sides of the cover opening 17 will extend across the ends of the pin 20 and prevent its accidental dislodgment.

While this invention has been described in detail in its present preferred form or embodiment, it will be apparent to those skilled in the art, after understanding the improvements, that various changes and modifications may be made therein without departing from the spirit or scope thereof. It is aimed in the appended claims to cover all such changes and modifications.

I claim:

1. A clutch cover and operating lever assembly, comprising a cover having a body portion, an attaching flange on said body portion, an integral perforated lip on said body portion, two directional fulcrum means on said lip, and a clutch operating lever pivoted to the clutch pressure plate extending through said perforated lip and having fulcrum engagement with said lip, said lever being adapted to exert pressure in either direction selectively upon said lip.

2. A clutch cover and operating lever assembly, comprising a dished body portion that bulges outward from its support, an attaching flange on said body portion secured to a member of a clutch, an inwardly projecting integral perforated lip on said body portion, two directional fulcrum means on said lip, and a clutch operating lever extending through and fulcrumed on said lip for pressure thereon selectively in either direction and operatively connected to a clutch pressure plate.

3. A clutch cover and operating lever assembly, comprising a pressure plate, an annular attaching flange, a strut portion disposed oblique to said flange, said strut portion having an aperture, and a lip extending inward of the strut portion at an edge of the aperture, said lip having an opening provided with opposed fulcrum means, said opening receiving and effecting a fulcrum for a clutch operating lever, said operating lever being pivoted in the clutch pressure plate and extending through said opening.

4. A clutch cover and operating lever assembly, comprising a clutch pressure plate, a clutch operating lever, means for mounting said lever on said pressure plate, and a clutch cover comprising a dished body having an opening to receive said operating lever, and a lip extended inward from an edge of said opening, said lip provided with an opening through which said operating lever passes, said lever having an arcuate boss adapted for engagement with opposite edges of said lip opening to effect a fulcrum for said lever.

5. A clutch cover and operating lever assembly, comprising a clutch pressure plate having lateral clevis lugs, a clutch operating lever, means for mounting said lever on said pressure plate comprising a pivot pin in said clevis lugs, and a clutch cover comprising a dished body having an opening to receive said clevis lugs and said operating lever, the opposite edges of said opening positioned across the ends of said pivot pin to retain the latter against longitudinal dislodgment, and a lip extended inward from an edge of said opening, said lip provided with an opening through which said operating lever passes into said dished body, said lever having an arcuate boss engaged with opposite edges of said lip opening to effect a fulcrum for said lever.

6. A clutch cover and a clutch pressure plate and operating lever assembly including pivotal elements for said operating lever, said cover comprising a unitary sheet metal structure providing a dished body bulged away from the pressure plate, an attaching rim flared outward from the edge of said body, a plurality of lips integral with said body that are bent inward from the bulged portion thereof, and means on said lips providing fulcrums for the pressure plate operating levers, the bulged portion of the body having openings adjacent said lips wherein are disposed the pivotal elements connecting the operating levers to the pressure plate.

7. A cover and a clutch pressure plate and operating lever assembly, including pivotal elements for said operating lever, said cover comprising a unitary sheet metal structure providing a dished body bulged away from the pressure plate, an attaching rim flared outward from the edge of said body, a plurality of lips integral with said body that are bent inward from the bulged portion thereof, and two directional fulcrum means on said lips providing fulcrums for the pressure plate operating levers in either direction of operation, the bulged portion of the body having openings adjacent said lips wherein are disposed the pivotal elements connecting the operating levers to the pressure plate.

REINHOLD C. ZEIDLER.

REFERENCES CITED

The following references are of record in the file of this patent:

UNITED STATES PATENTS

| Number | Name | Date |
|---|---|---|
| 1,487,223 | Fawick et al. | Mar. 18, 1924 |
| 2,058,863 | Goodwin | Oct. 27, 1936 |
| 2,163,971 | Zeidler | June 27, 1939 |
| 2,194,040 | Wemp | Mar. 19, 1940 |